United States Patent [19]

Mohri et al.

[11] Patent Number: 5,109,976
[45] Date of Patent: May 5, 1992

[54] CLEANER

[75] Inventors: Toyoshige Mohri, Minoo; Toshiyuki Makino, Tokyo, both of Japan

[73] Assignee: Horyo Corporation, Osaka, Japan

[21] Appl. No.: 511,689

[22] Filed: Apr. 20, 1990

[30] Foreign Application Priority Data

Nov. 21, 1989 [JP] Japan ............................ 1-135894[U]

[51] Int. Cl.⁵ .................................................. B65G 45/14
[52] U.S. Cl. ...................................... 198/498; 198/494;
15/256.52
[58] Field of Search ............... 198/494, 496, 497, 498;
15/256.52

[56] References Cited

U.S. PATENT DOCUMENTS

| | | | |
|---|---|---|---|
| 1,239,066 | 9/1917 | Winters | 198/498 |
| 1,299,324 | 4/1919 | Goodykoontz | 198/498 |
| 1,330,967 | 2/1920 | Winters | 198/498 |
| 2,265,386 | 12/1941 | McBerty et al. | 15/256.52 X |
| 2,652,920 | 9/1953 | Bowman | 198/498 |
| 4,825,996 | 5/1989 | Davidts | 198/497 |
| 4,838,409 | 6/1989 | Rappen | 198/497 |

FOREIGN PATENT DOCUMENTS

| | | | |
|---|---|---|---|
| 2035548 | 1/1972 | Fed. Rep. of Germany | 198/498 |
| 2357353 | 5/1975 | Fed. Rep. of Germany | 198/498 |
| 0106710 | 6/1985 | Japan | 198/497 |
| 0219430 | 9/1968 | U.S.S.R. | 198/497 |
| 0432061 | 8/1975 | U.S.S.R. | 198/498 |
| 0488765 | 1/1976 | U.S.S.R. | 198/498 |
| 0570526 | 9/1977 | U.S.S.R. | 198/498 |
| 0570527 | 9/1977 | U.S.S.R. | 198/498 |
| 0581046 | 11/1977 | U.S.S.R. | 198/498 |

*Primary Examiner*—Robert P. Olszewski
*Assistant Examiner*—James R. Bidwell
*Attorney, Agent, or Firm*—Armstrong, Nikaido, Marmelstein, Kubovcik & Murray

[57] ABSTRACT

A cleaner comprising a rotary drum, radial rubber blades attached to the outer surface of the drum, and abrasion-resistant ceramic members each secured to the outer edge portion of each of the blades.

8 Claims, 8 Drawing Sheets

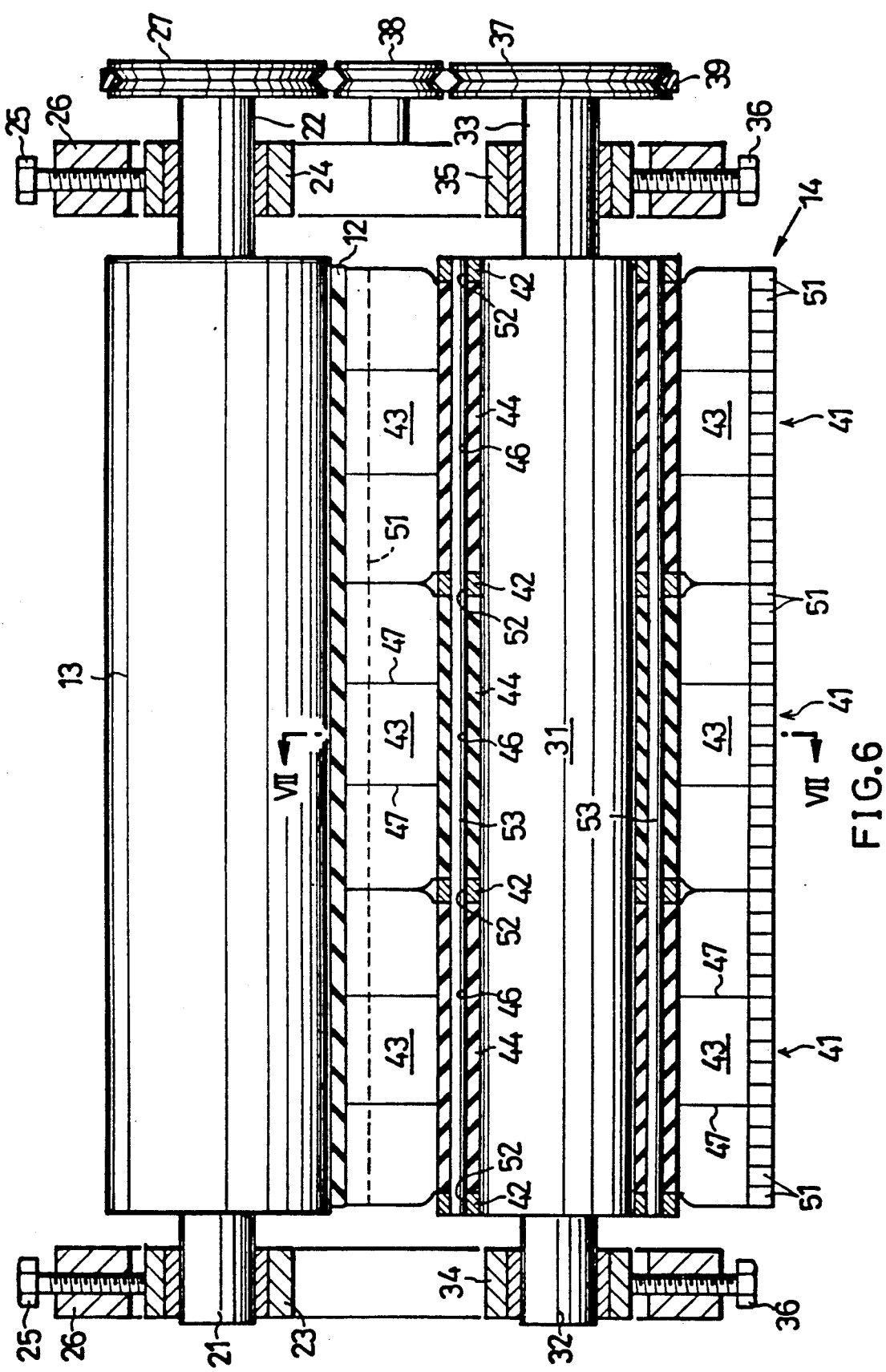

CLEANER

BACKGROUND OF THE INVENTION

The present invention relates to a belt cleaner for removing deposits from the belt surfaces of belt conveyors for transporting materials such as iron ore, cement, coal and coke, or to a floor cleaner for removing corrosion from decks of ships and tanks, removing white lines and characters from pavements and cleaning sewers.

Belt cleaners heretofore known include those of the scraper type having a fixed blade which is adapted to be pressed against the belt for removing deposits therefrom, and those having a rotary brush which is rotated at a high speed with bristles of nylon or the like in contact with the belt to dislodge deposits with the bristles.

The cleaner of the scraper type requires a cumbersome procedure for frequently adjusting the fixed position of the blade as the blade wears. Further if either the blade or the belt has irregularities, some deposit will be left unremoved. If pressed against the belt with an excessive force, the blade is likely to cut the belt.

When the material handled by the belt is free flowing, the cleaner of the rotary brush type will not encounter any problem, but when it is sticky, some deposit will remain unremoved by the brush. The cleaner of this type has another problem in that the bristles wear away markedly.

Known floor cleaners include those having a rotary wire brush and shotblast machines.

The wire brush wears away markedly and needs to be replaced frequently, and thus, becomes cumbersome. Further, if the surface to be cleaned has irregularities, the surface will be left uncleaned locally. On the other hand, the shotblast machine is heavy and therefore inconvenient to carry, while the machine makes a loud noise.

SUMMARY OF THE INVENTION

The main object of the present invention is to provide a cleaner free of the foregoing problems.

The present invention provides a cleaner which comprises a rotary drum, radial rubber blades attached to the outer surface of the drum, and abrasion-resistant ceramic members each secured to the outer edge portion of each of the blades.

The term "ceramic" is used herein not only in a narrow sense of the term in which it refers to such a material consisting primarily of alumina or the like but also in a broad sense meaning a cemented carbide such as tungsten carbide.

The cleaner of the present invention comprises a plurality of rubber blades extending radially from the outer surface of a rotary drum, so that the blades can be in intimate contact with the belt to be cleaned. Accordingly, the surface to be cleaned, even if having irregularities, will not be left uncleaned locally.

The blades have suitable elasticity, are therefore unlikely to mar the surface to be cleaned and will not permit the deposit to remain partly unremoved even if it is sticky.

The abrasion-resistance members secured to the outer edges of the blades make the blades resistant to abrasion, eliminating the need to frequently adjust the position where the drum is installed.

BRIEF DESCRIPTION OF THE DRAWINGS

FIGS. 4 to 7 show the cleaner as adapted for use in cleaning a conveyor belt;

FIG. 4 is a perspective view partly broken away and showing the cleaner and its neighborhood;

FIG. 5 is a side elevation schematically showing the cleaner and the conveyor;

FIG. 6 is a view in vertical section of the cleaner and its neighborhood;

FIG. 7 is a view in cross section taken along the line VII—VII in FIG. 6;

FIG. 8 is a perspective view partly broken away and showing the cleaner, a casing, etc.;

FIG. 9 is a view in vertical section of the same;

FIG. 10 is an enlarged view in horizontal section of a drum and blades; and

FIG. 11 is an enlarged view in vertical cross section of the drum, blades and casing.

DESCRIPTION OF THE PREFERRED EMBODIMENTS

Figure 1:
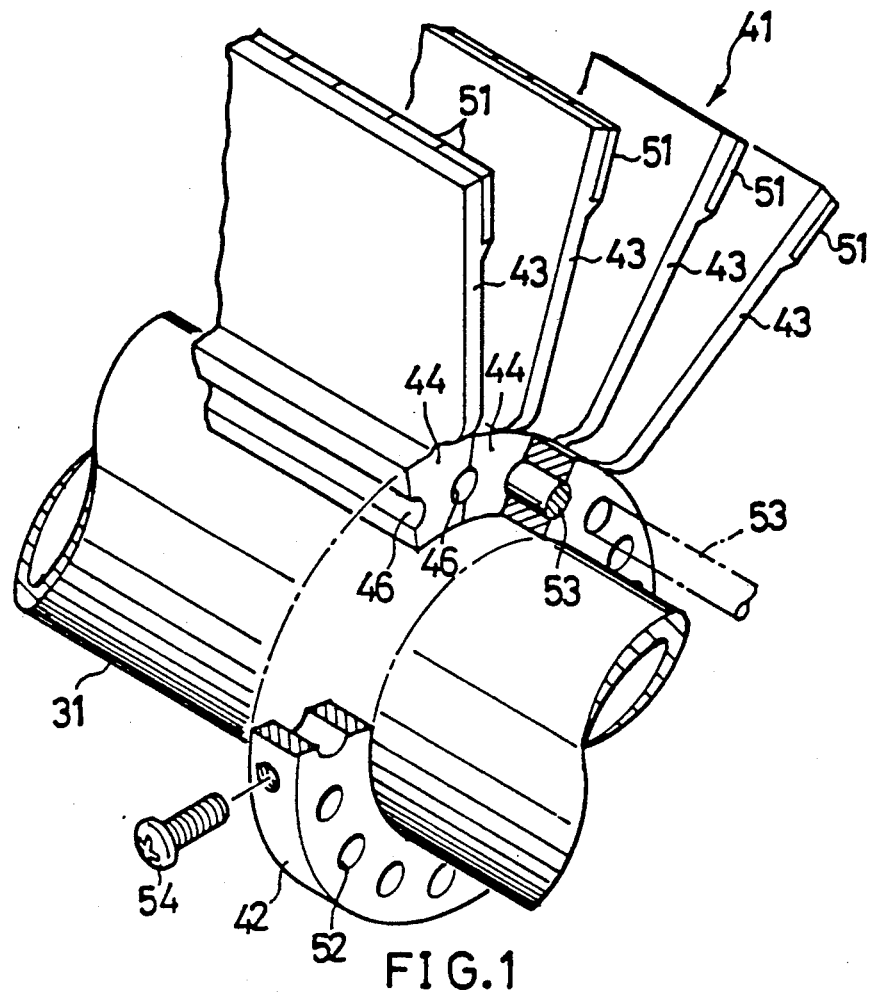
FIG. 1 is a fragmentary perspective view partly in section and showing a cleaner embodying the invention.

Embodiments of the present invention will be described below with reference to the drawings.

First, a cleaner for use in cleaning a conveyor belt will be described with reference to FIGS. 4 to 7.

In the following description, the terms "front" and "rear" are used based on FIG. 5; the right-hand side of the drawing will be referred as "front," and the left-hand side thereof as "rear." The terms "right" and "left" are used as the cleaner is viewed from behind toward the front.

Figure 5:
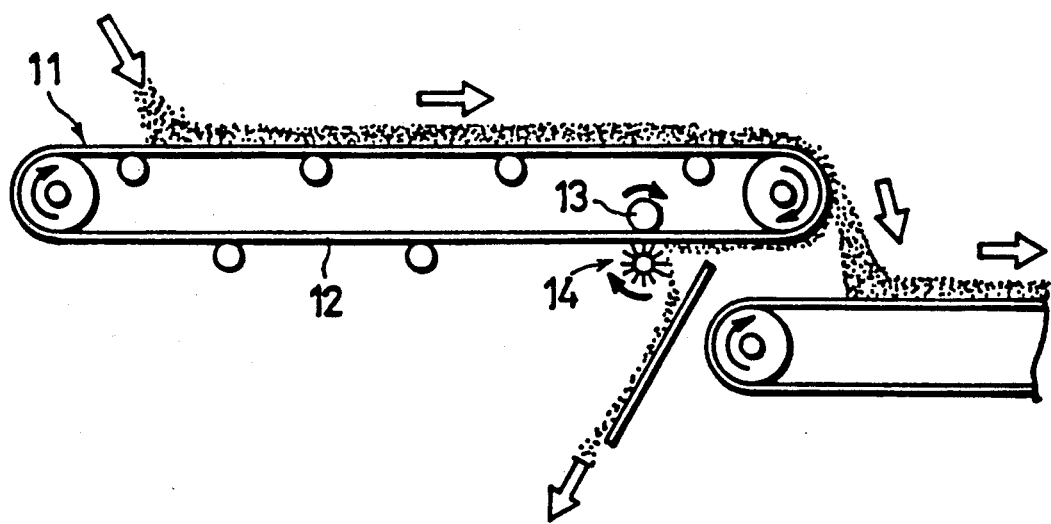

With reference to FIG. 5, a belt conveyor 11 having a belt 12 extends in the rear-to-front direction. A power take-off roller 13 for driving a cleaner 14 is disposed on the upper side of the lower belt path, and the cleaner 14 on the lower side of the path. The roller 13 and the cleaner 14 are positioned across the belt path at right angles therewith.

Figure 4:
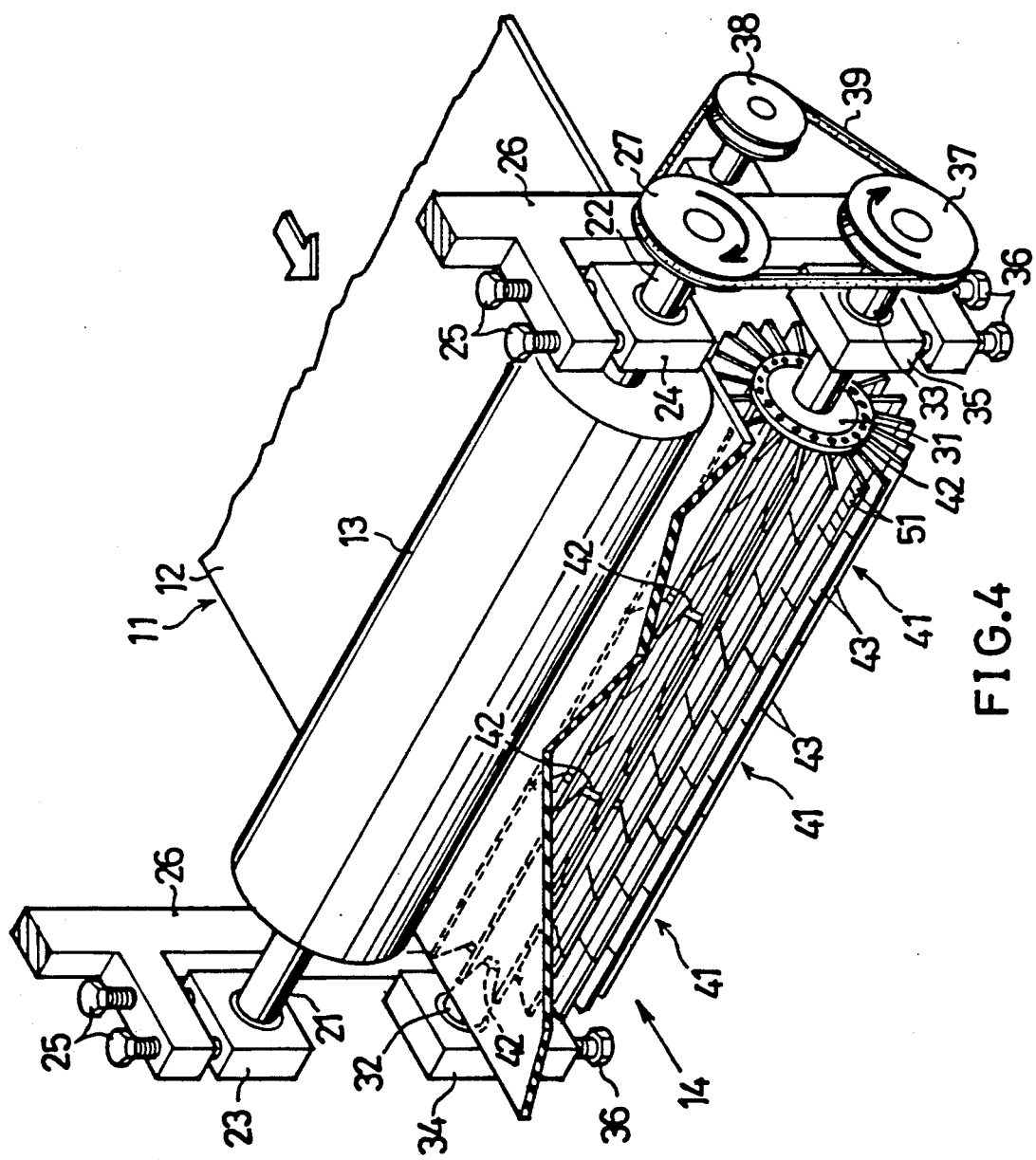
Figure 7:
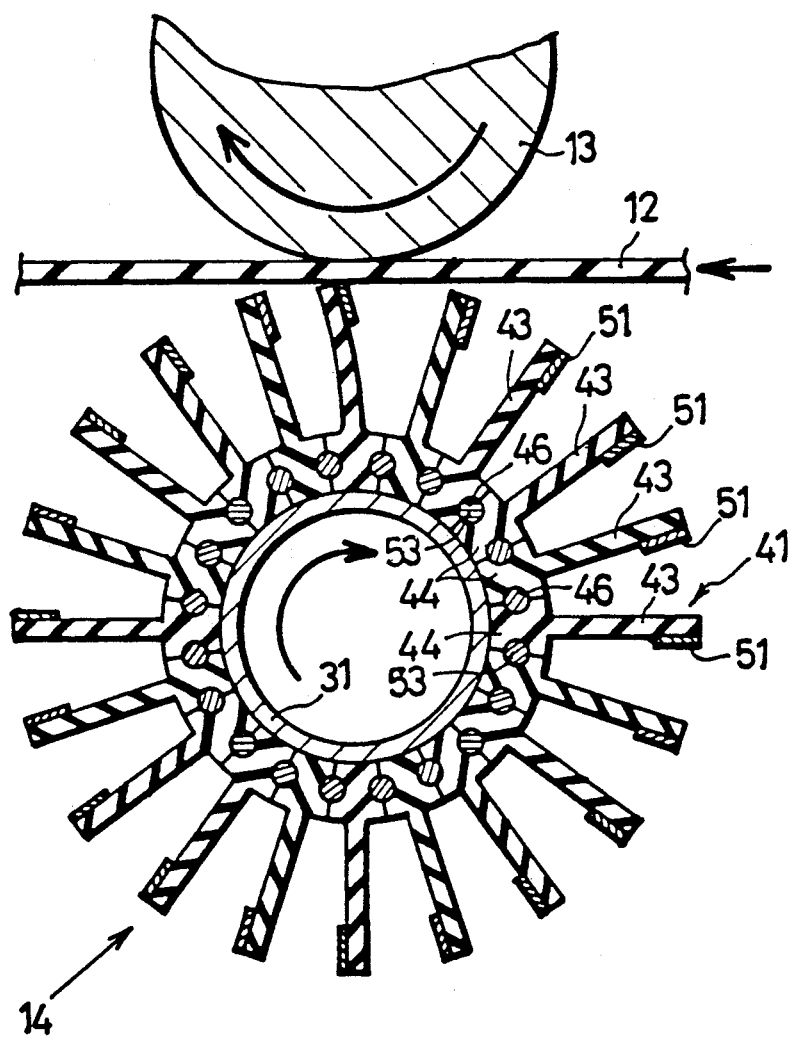

With reference to FIG. 4, the roller 13 is provided at its left and right ends with support shafts 21, 22, respectively. The support shafts 21, 22 are supported respectively by bearings 23, 24, each of which is suspended by a pair of bolts 25 from a support member 26 and positioned at an adjustable level. A drive pulley 27 is fixed to the right end of the right support shaft 22.

The belt cleaner 14 has a rotary drum 31. The drum 31 has support shafts 32, 33 at its left and right ends, respectively. These shafts 32, 33 are supported by bearings 34, 35, respectively, each of which is suspended by a pair of bolts 36 from the support member 26 at an adjustable level. A driven pulley 37 is fixed to the right end of the right support shaft 33. An idle pulley 38 is disposed in front of an intermediate location between the drive pulley 27 and the driven pulley 37. A V-belt 39 is reeved around these three pulleys 27, 37 and 38.

When the belt conveyor 11 is driven forward with the lower side of its belt 12 in rearward travel, the roller 13 is rotated clockwise when seen from the right side thereof. The rotation of the roller 13 is transmitted by the V-belt 39 to the drum 31, which in turn is rotated similarly clockwise when seen from the right side thereof.

As shown in FIG. 6, three impellers 41 are mounted on the outer surface of the drum 31 as arranged axially of the drum. Four annular mount members 42 of metal are provided as if holding the impellers 41 therebetween.

With reference to FIG. 1, each impeller 41 comprises a plurality of rubber blades 43 arranged radially. Each blade 43 is in the form of a plate extending across the belt 12 and has an enlarged portion 44 at its base end. Opposite side faces of the enlarged portion 44 are tapered inward. The enlarged portions 44 of all blades 43 constituting one impeller 41 are joined together to form a single tubular boss portion surrounding the drum 31. A groove 46, semicircular in cross section, is formed in each side face of the enlarged portion 44. Two adjacent grooves 46 are combined to form a single rod inserting bore. Fifteen ceramic chips 51, each in the form of a square plate, are arranged in contact with one another in a row along the outer edge of the blade 43 and secured to the outer edge portion of one of opposite surfaces of the blade facing the direction of rotation of the impeller. The mount member 42 has holes 52 arranged at a given spacing and coinciding with the rod inserting bores formed by the grooves 46 of the blades 43. The three impellers 41 and the four mount members 42 are so arranged that the rod inserting bores formed by the grooves 46 of the blades 43 of the three impellers 41 and the holes 52 in the four mount members 42 form combined bores extending axially of the drum and each consisting of corresponding inserting bores and holes 52 in communication. A metal round rod 53 is inserted through each of the combined bores. The rod 53 is welded at its opposite ends to the two mount members 42 at the respective ends of the drum 31. Each of the mount members 42 is fastened to the drum 31 with screws 54.

With reference to FIG. 6, the blade 43 has two slits 47 formed in its plate-like portion other than the enlarged portion 44 and extending from the inner end of the plate-like portion adjacent to the portion 44 to the outer end of the blade 43. The fifteen chips 51 secured to each blade 43 are divided into three groups of five chips each. The three segments of blade plate-like portion divided by the slits 47 can be warped individually.

When the drum 31 is rotated clockwise as stated above, the blades 43 revolve in the same direction. The level of the drum 31 is so adjusted that when each blade 43 is brought to an upright position during revolution, the blade outer edge is pressed against the belt 12. Since the direction of travel of the belt 12 is exactly opposite to the direction of movement of the blade 43 to be pressed against the belt 12, the deposit on the belt 12 can be efficiently scraped off with the chips 51 at the outer edge of the pressed blade 43.

Figure 2:
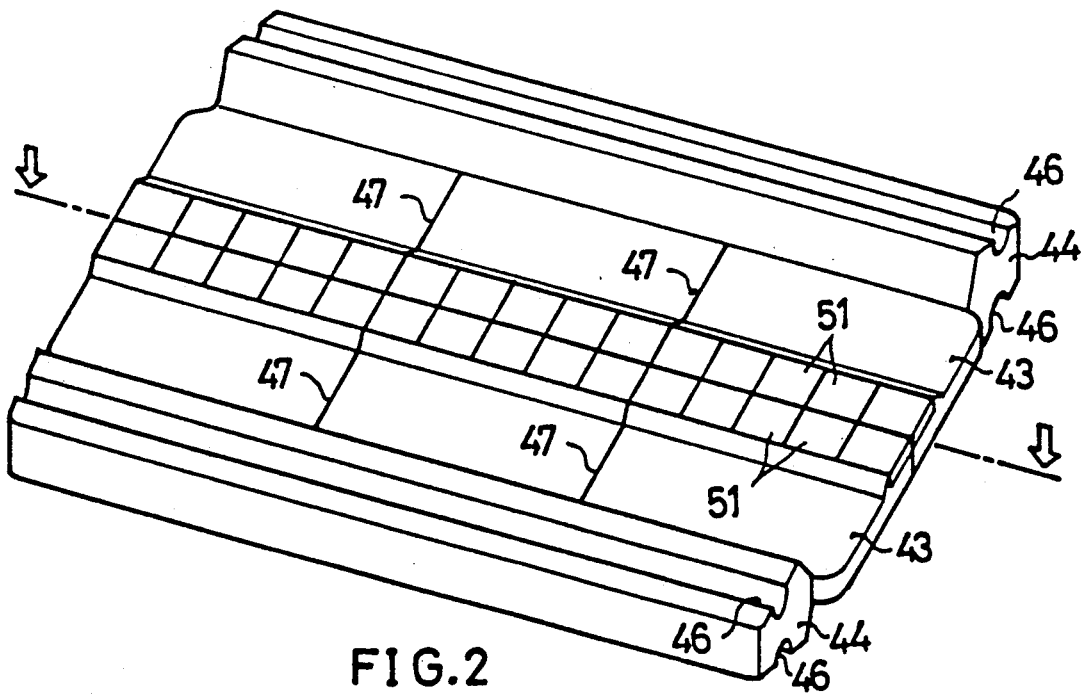
FIG. 2 is a diagram illustrating how to form blades.

The blade 43 is formed by vulcanizing crude rubber. During this step, the chips 51 are adhered to the blade by baking. Blades 43 can be formed efficiently with chips 51 adhered thereto by forming two blades 43 at the same time as joined together end-to-end and thereafter cutting the joint as illustrated in FIG. 2.

Figure 3:
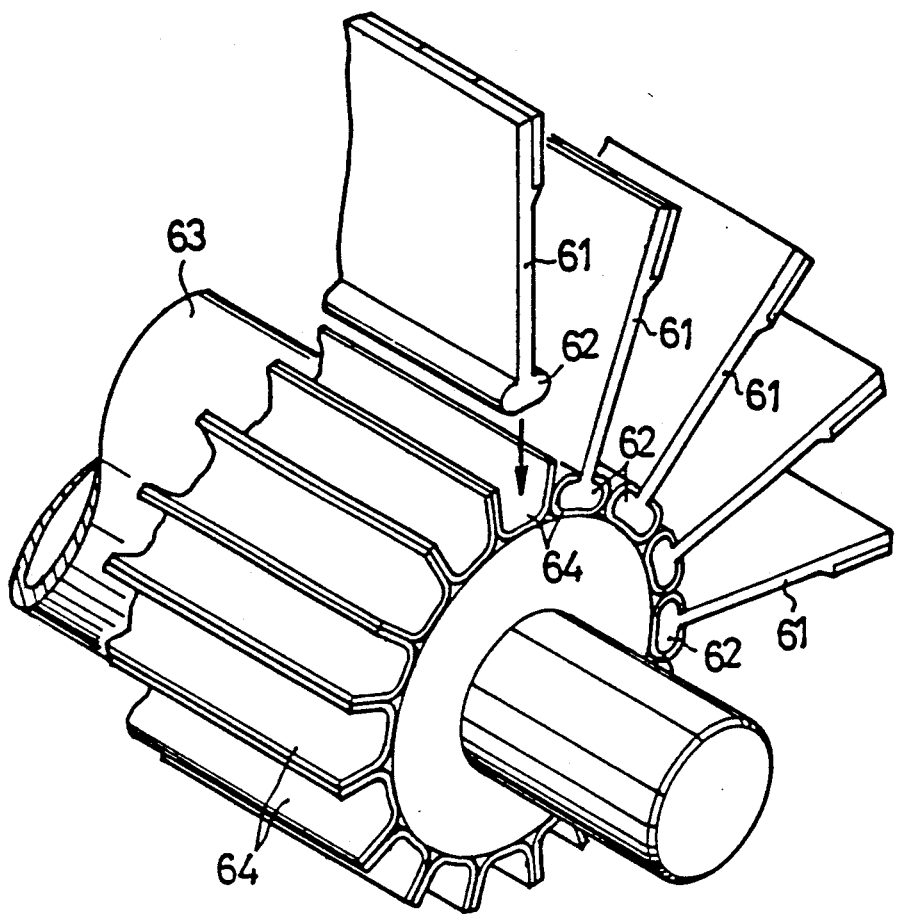
FIG. 3 is a perspective view corresponding to FIG. 1 and showing another embodiment.

FIG. 3 shows blades 61 according to another embodiment. With this embodiment, the blade 61 is formed at its base end with an engaging enlarged portion 62, which is enclosed with a mount member 64 welded to the outer surface of a drum 63, whereby the blade 61 is attached to the drum 63.

With reference to FIGS. 8 to 11, a cleaner will be described next which is adapted for use in cleaning floors.

Figure 9:
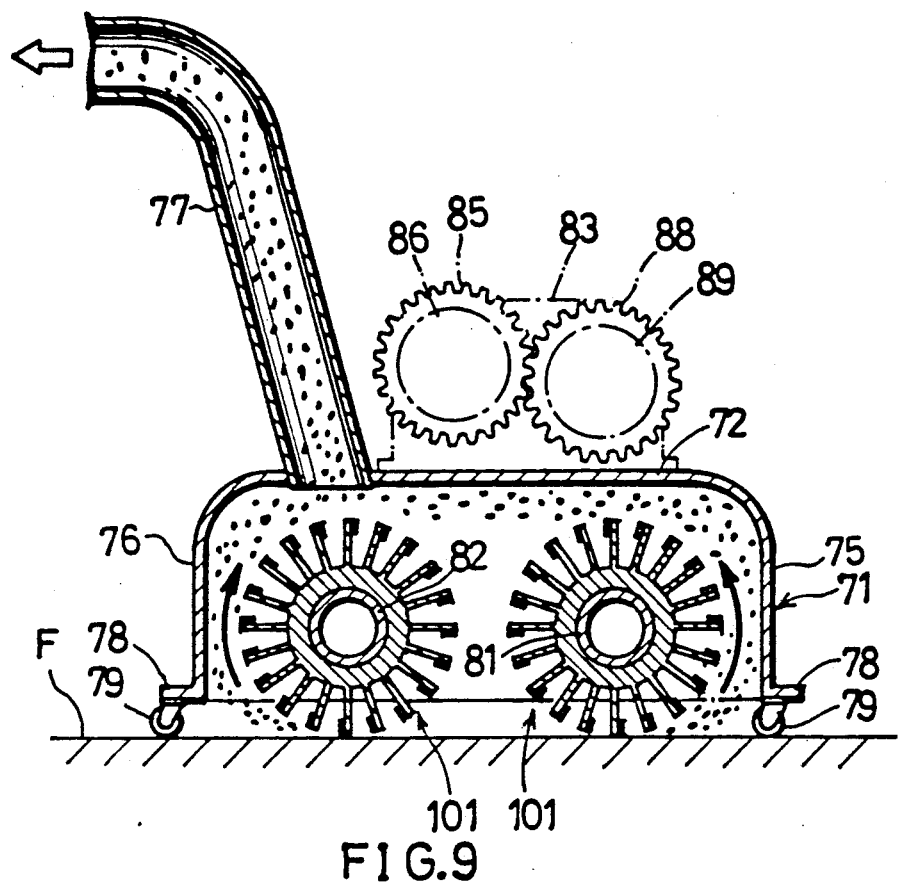
Figure 11:
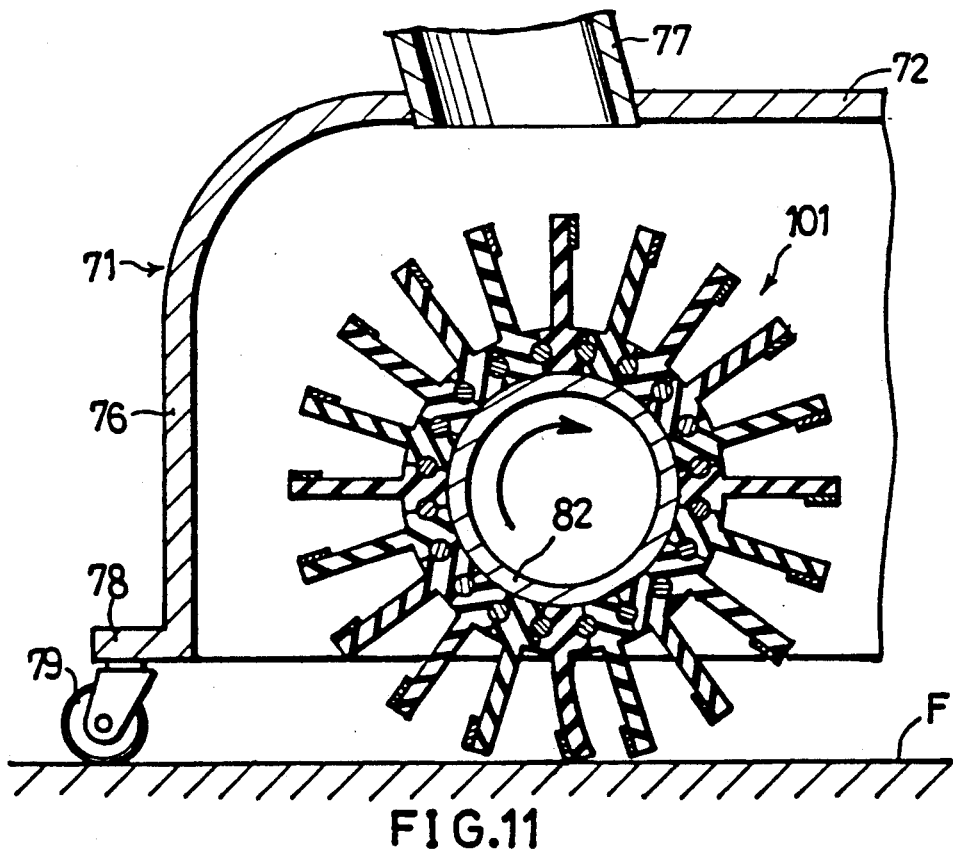

The terms "front" and "rear" are used in the following description based on FIG. 9; the right-hand side of FIG. 9 will be referred to as "front," and the left-hand side thereof as "rear." The terms "right" and "left" are used as the cleaner is viewed from behind toward the front.

The cleaner is housed in a casing 71, which is in the form of a box having an open lower side and which comprises a top wall 72, and left, right, front and rear side walls 73 to 76. The top wall 72 has a suction pipe 77 connected thereto and serving also as a handle. The casing 71 has at its lower end a flange 78 carrying castors 79 at the respective four corners thereof. Housed in the casing 71 are a pair of front and rear rotary drums 81, 82 extending in the right-to-left direction in parallel to each other. A motor 84 directed rightward is mounted by a bracket 83 on the right side portion of the top wall 72. A drive gear 85 and a rear drive pulley 86 are fixed to the output shaft of the motor 84. An idle shaft 87 parallel to the output shaft of the motor 84 is supported by the bracket 83 and fixedly provided with a driven gear 88 and a front drive pulley 89. The driven gear 88 is in mesh with the drive gear 85.

Figure 10:
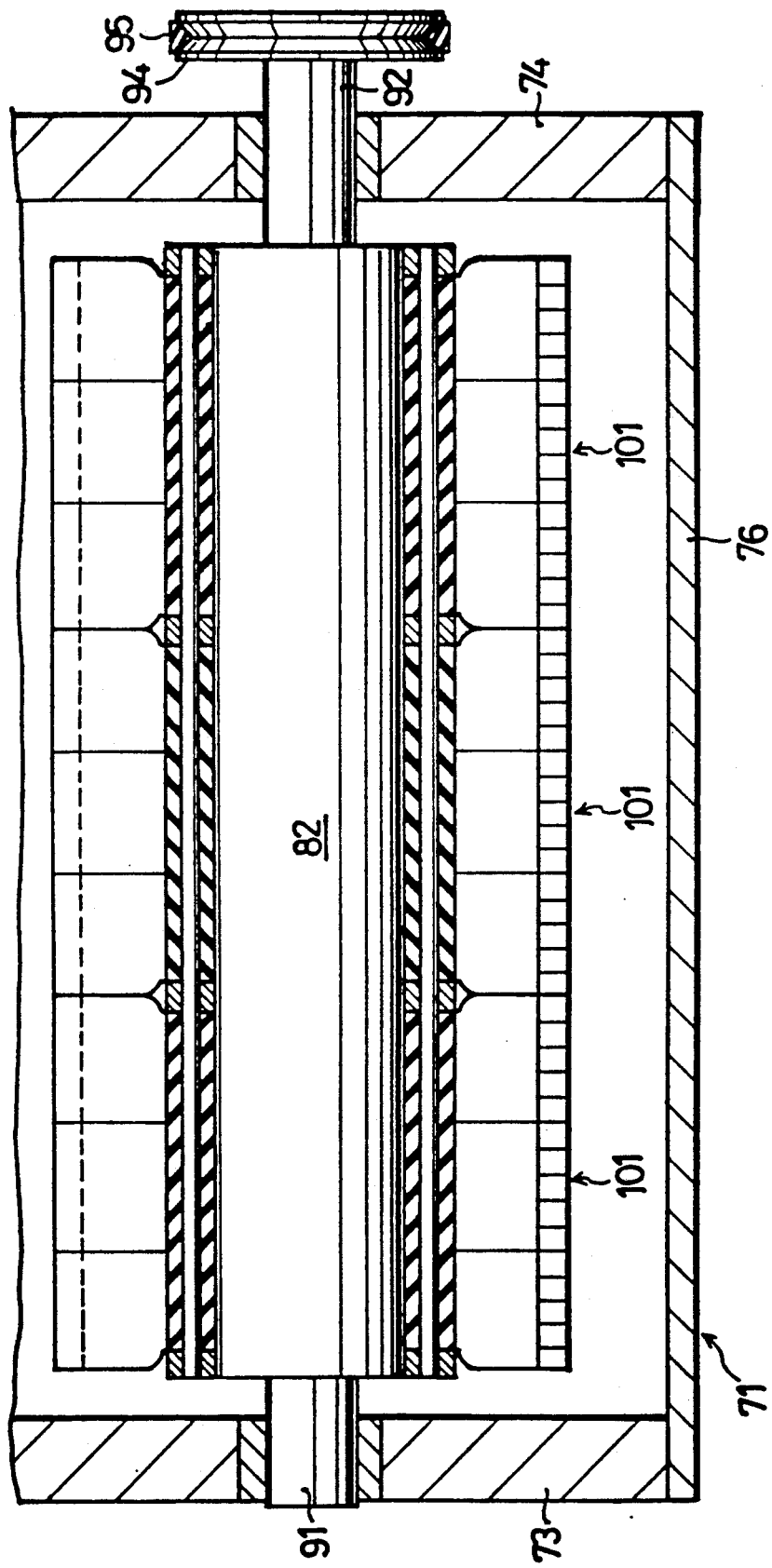

As seen in FIG. 10, the rear drum 82 has a left support shaft 91 projecting leftward from its left end and rotatably supported by the left side wall 73. The rear drum 82 has a right support shaft 92 projecting rightward from its right end and rotatably supported by the right side wall 74. The right support shaft 92 extends rightward beyond the right side wall 74 and fixedly carries a rear driven pulley 94 on the projecting end. Although not shown in detail, the front drum 81, like the rear drum 82, is supported by the left and right side walls 73, 74 and has a front driven pulley 93. A rear belt 95 is reeved around the rear driven pulley 94 and the rear drive pulley 86. A front belt 96 is reeved around the front driven pulley 93 and the front drive pulley 89.

The front and rear rotary drums 81, 82 are each similarly provided with an impeller 101. The impeller 101 has the same construction as the one included in the belt cleaner and therefore will not be described in detail.

Figure 8:
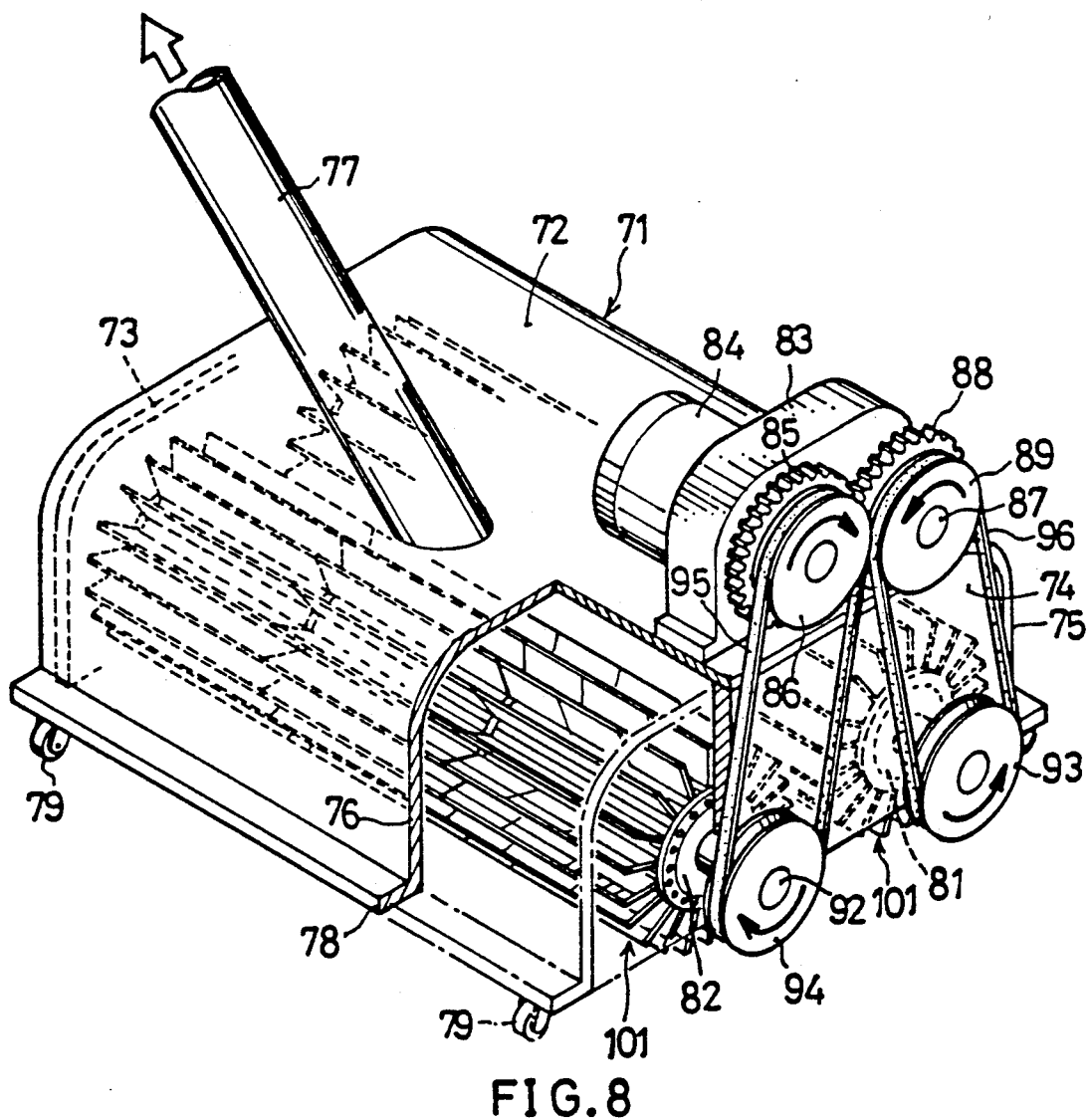
FIGS. 8 to 11 show a cleaner for use in cleaning floors.

With reference to FIG. 8, the output shaft of the motor 64, when driven clockwise, rotates both the drive gear 85 and the rear driven pulley 86 clockwise, causing the rear belt 95 to rotate the rear drum 82 clockwise along with the rear driven pulley 94. On the other hand, the clockwise rotation of the drive gear 85 rotates the driven gear 88 counterclockwise along with the front drive pulley 89, causing the front belt 96 to rotate the front drum 81 counterclockwise along with the front driven pulley 93.

When the two drums 81, 82 are rotated in directions opposite to each other, each of the impellers 101 rotates in the same corresponding direction. The height of the casing 71 is so adjusted that when each blade of the impellers 101 is brought to a downward vertical position, the outer edge of the blade is pressed against the surface F to be cleaned. Since the two drums 81, 82 rotate in opposite directions, the casing 71 will not be moved by the rotation of the drums 81, 82 uselessly, with the result that the deposit can be efficiently scraped off the surface F with the chips at the outer edge of each blade of the impellers 101 pressed against the surface. The deposit removed is discharged from the casing 71 through the suction pipe 77.

While the invention has been particularly shown and described in reference to preferred embodiments thereof, it will be understood by those skilled in the art that changes in form and details may be made therein without departing from the spirit and scope of the invention.

What is claimed is:

1. A cleaner comprising:

a rotary drum;

radial rubber blades attached to the outer surface of the drum, each of the blades being formed with an enlarged portion at the base end portion thereof, the enlarged portions being formed separately from each other, and the separate enlarged portions of the blades when joined together forming a tubular boss portion surrounding the drum, wherein said separately formed enlarged portions include connecting means for connecting said enlarged portions together; and abrasion-resistant ceramic members each secured to the outer edge portion of each of the blades.

2. A cleaner comprising:

a horizontal rotary drum disposed below the lower belt path of a belt conveyor across the path;

radial rubber blades attached to the outer surface of the drum and each having an outer edge in contact with the lower surface of the belt, each of the blades being formed with an enlarged portion at the base end portion thereof, the enlarged portions being formed separately from each other, and the separate enlarged portions of the blades when joined together forming a tubular boss portion surrounding the drum, wherein said separately formed enlarged portions include connecting means for connecting said enlarged portions together; and abrasion-resistant ceramic members each secured to the outer edge portion of each of the blades.

3. A cleaner as defined in any one of claims 1 or 2 wherein each of the abrasion-resistant members comprises a plurality of chips arranged in contact with one another along the outer edge portion of the blade.

4. A cleaner as defined in claim 3 wherein the enlarged portion has its opposite side faces inwardly tapered so that the enlarged portions of all the blades constituting a single impeller are joined together to form a single tubular boss portion surrounding the drum, each enlarged portion being formed in each side face thereof with a semicircular groove so that the grooves of adjacent enlarged portions form a single rod inserting bore, a blade fixing rod extending through the inserting bore and having its opposite ends secured to the drum.

5. A cleaner as defined in claim 3 wherein mount members C-shaped in cross section and identical in number to the number of blades extend axially of the drum and are secured to the outer surface of the drum, and the blades are each formed at the base end thereof with an enlarged portion fixedly held by the mount member.

6. A cleaner as defined in claim 4 wherein each of the blades is formed with at least one slit extending between adjacent chips from the outer end of the blade to a position close to the enlarged portion.

7. A cleaner as defined in claim 2 wherein the drum is supported by a support member means for adjusting a level of said drum relative to said belt conveyor.

8. A cleaner as defined in claim 7 wherein a cleaner driving power take-off roller having an axis parallel to the axis of the drum is disposed on opposite side of the lower belt path to the drum and is in contact with the upper surface of the belt, the cleaner having means for transmitting to the drum the torque of the roller rotatable by the travel of the belt.

* * * * *